United States Patent
Ozluturk et al.

(10) Patent No.: US 7,599,668 B2
(45) Date of Patent: Oct. 6, 2009

(54) METHOD AND APPARATUS FOR REDUCING ANTENNA CORRELATION

(75) Inventors: Fatih Ozluturk, Port Washington, NY (US); Philip J. Pietraski, Huntington Station, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 609 days.

(21) Appl. No.: 11/202,570

(22) Filed: Aug. 12, 2005

(65) Prior Publication Data

US 2006/0035605 A1 Feb. 16, 2006

Related U.S. Application Data

(60) Provisional application No. 60/601,674, filed on Aug. 12, 2004.

(51) Int. Cl.
*H04B 1/02* (2006.01)
(52) U.S. Cl. .................... 455/101; 455/107; 455/562.1; 455/121
(58) Field of Classification Search ................ 455/101, 455/277.1, 562.1, 67.16, 121, 107; 375/347
See application file for complete search history.

(56) References Cited

U.S. PATENT DOCUMENTS

| | | | | |
|---|---|---|---|---|
| 5,842,135 A | * | 11/1998 | Ishijima | ...................... 455/504 |
| 6,005,516 A | * | 12/1999 | Reudink et al. | .......... 455/277.2 |
| 6,140,972 A | * | 10/2000 | Johnston et al. | ............. 343/725 |
| 6,212,406 B1 | * | 4/2001 | Keskitalo et al. | ......... 455/562.1 |
| 6,771,988 B2 | * | 8/2004 | Matsuoka et al. | ........ 455/562.1 |
| 6,850,741 B2 | * | 2/2005 | Lei et al. | ..................... 455/101 |
| 6,999,724 B2 | * | 2/2006 | Chizhik et al. | ............. 455/63.1 |
| 7,010,281 B2 | * | 3/2006 | Ukena et al. | ............. 455/127.1 |
| 7,069,050 B2 | * | 6/2006 | Yoshida | ................... 455/562.1 |
| 7,072,692 B1 | * | 7/2006 | Katz et al. | ............... 455/562.1 |
| 2003/0123381 A1 | * | 7/2003 | Zhuang et al. | .............. 370/208 |
| 2003/0142014 A1 | * | 7/2003 | Rao et al. | .................... 455/428 |
| 2003/0156570 A1 | * | 8/2003 | Alamouti et al. | ............ 370/347 |
| 2003/0185326 A1 | | 10/2003 | Kolze | |
| 2004/0066251 A1 | * | 4/2004 | Eleftheriades et al. | ...... 333/117 |
| 2005/0179607 A1 | * | 8/2005 | Gorsuch et al. | ............ 343/754 |
| 2005/0266902 A1 | * | 12/2005 | Khatri et al. | ............. 455/575.7 |

* cited by examiner

*Primary Examiner*—Lana N Le
(74) *Attorney, Agent, or Firm*—Volpe and Koenig, PC

(57) ABSTRACT

The present invention is related to a method and apparatus for reducing antenna correlation between multiple antennas. A transmitter generates at least two beams with a plurality of antennas. The generated beams are spatially separated to point away each other. Therefore, the transmitted signals travel through different channel conditions and arrive at a receiver mutually uncorrelated. The beams may be generated by antennas having different antenna pattern, or by an array antenna. The beams may be polarized differently. The schemes may be implemented on a subcarrier basis in an orthogonal frequency division multiplexing (OFDM) system. Trellis coded mapping may be utilized for adjacent symbols to be mapped to antennas with low correlation.

7 Claims, 3 Drawing Sheets

EG. ODD AND EVEN SUBCARRIER GROUPS AT
DIFFERENT BEAMS

US 7,599,668 B2

METHOD AND APPARATUS FOR REDUCING ANTENNA CORRELATION

CROSS REFERENCE TO RELATED APPLICATION

This application claims the benefit of U.S. Provisional Application No. 60/601,674 filed Aug. 12, 2004, which is incorporated by reference as if fully set forth.

FIELD OF INVENTION

The present invention is related to wireless communication systems. More particularly, the present invention is related to a method and apparatus for reducing antenna correlation between multiple antennas.

BACKGROUND

A scheme for utilizing multiple antennas, such as multiple-input multiple-output (MIMO) system, has been developed. By utilizing multiple transmit and receive antennas, a capacity and throughput of the wireless communication system can be enhanced. The performance enhancement is restricted as a correlation of the signals between the plurality of antennas becomes higher. If the correlation of antennas is high, the advantage of a multiple antenna system may be lost.

In a MIMO system, data is converted to a plurality of parallel data streams and the parallel data streams are transmitted simultaneously from different antennas. The data stream may be transmitted only from a subset of the antennas. Selection of antennas for transmission is often based on quality of the link seen at the antenna or other relevant quality indicators. The performance of the MIMO system degrades as signals become more correlated between antenna transmissions.

In general, the antenna correlation depends on factors such as distance between the antennas and channel state including scatterings conditions. Signals received at the receiver are subject to multipath fading and the antenna correlation becomes lower as the influence of fading differs each other. Therefore, it is desirable to lower the antenna correlation in wireless communication systems utilizing multiple antennas.

SUMMARY

The present invention is related to a method and apparatus for reducing antenna correlation between multiple antennas. A transmitter generates at least two beams with a plurality of antennas. The generated beams are spatially separated to point away each other. Therefore, the transmitted signals travel through different channel conditions and arrive at a receiver mutually uncorrelated. The beams may be generated by antennas having different antenna pattern, or by an array antenna. The beams may be polarized differently. The schemes may be implemented on a subcarrier basis in an orthogonal frequency division multiplexing (OFDM) system. Trellis coded mapping may be utilized for adjacent symbols to be mapped to antennas with low correlation.

DETAILED DESCRIPTION OF THE PREFERRED EMBODIMENTS

The present invention is applicable to any wireless communication systems employing multiple transmit or receive antennas for transmission and reception including, but not limited to, MIMO antenna schemes for OFDM systems.

The features of the present invention may be incorporated into an integrated circuit (IC) or be configured in a circuit comprising a multitude of interconnecting components.

Hereafter, a wireless transmit/receive unit (WTRU) includes but is not limited to a user equipment, mobile station, fixed or mobile subscriber unit, pager, or any other type of device capable of operating in a wireless environment. When referred to hereafter, a base station includes but is not limited to a Node-B, site controller, access point or any other type of interfacing device in a wireless environment. The transmitting and receiving features of the following embodiments can be utilized in a WTRU, base station or both.

Although the following embodiments emphasize transmit diversity, the same principals can be applied to reception diversity.

Figure 1:
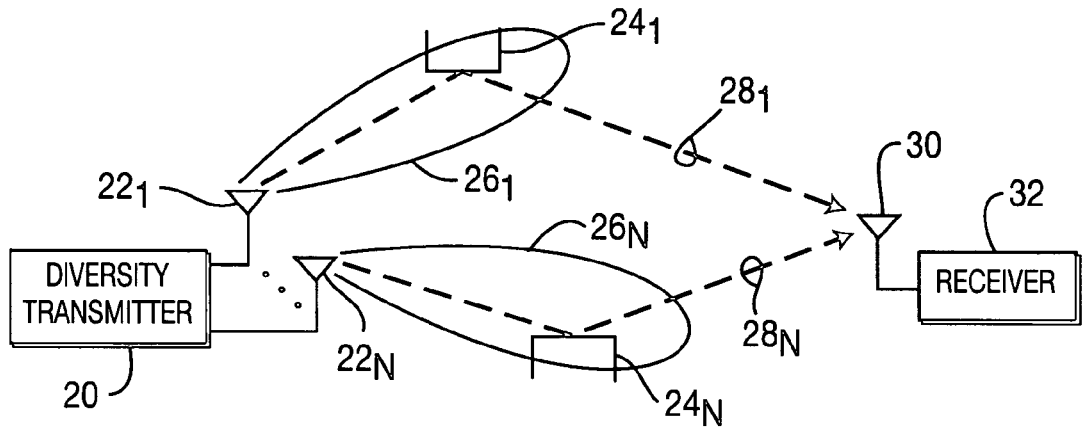
FIG. 1 is a simplified block diagram of a diversity transmission system with directional antenna elements.

FIG. 1 is a simplified block diagram of a diversity transmission system with directional antenna elements. A diversity transmitter 20 produces a signal or signals for transmission over an antenna array. The antenna array has antenna elements $22_1$ to $22_N$ that are capable of producing their own antenna beam or pattern $26_1$ to $26_N$. These beams/patterns $26_1$ to $26_N$ may differ in the azimuth, elevation or both.

As illustrated in FIG. 1, these different beams/patterns $26_1$ to $26_N$ result in the transmitted signals following different paths $28_1$ to $28_N$. Path $28_1$ results from the transmission from antenna element $22_1$ through beam/pattern $26_1$ and being scattered off of scatterer $24_1$. Path $28_N$ results from the transmission from antenna element $22_N$ through beam/pattern $26_N$ and being scattered off of scaterer $24_N$. The different paths $28_1$ to $28_N$ are received by an antenna or antenna array 30 and processed by a receiver 32. For simplicity, FIG. 1 illustrates one path per beam/pattern. In practice, each beam/pattern results in various multipath scattering arrangements.

The unique beams/patterns formed by the antenna elements $22_1$ to $22_N$ can be produced by various techniques. One technique is to alter the physical arrangement of the elements to create the differing beams/patterns. To illustrate, some beams may be planar and some may have an uptilt. Additionally, metamaterials may be used for the antenna elements. These materials can be used to create highly directional antenna elements that may be oriented to "point away" from each other. Since the antenna patterns "point away" from one another, the signals transmitted by these antennas experience different channel conditions. The channel conditions are mainly determined by the scattering environment of the channel through which the signal travels. Signals in different scattering environments have different multipath fading patterns. As a result, the transmitted signals by each transmit antenna are received mutually uncorrelated. Such an arrangement is desirable for antenna arrays with little separation between the elements. These closely packed elements can be "pointed away" from one another to reduce or eliminate cross correlation.

Figure 2:
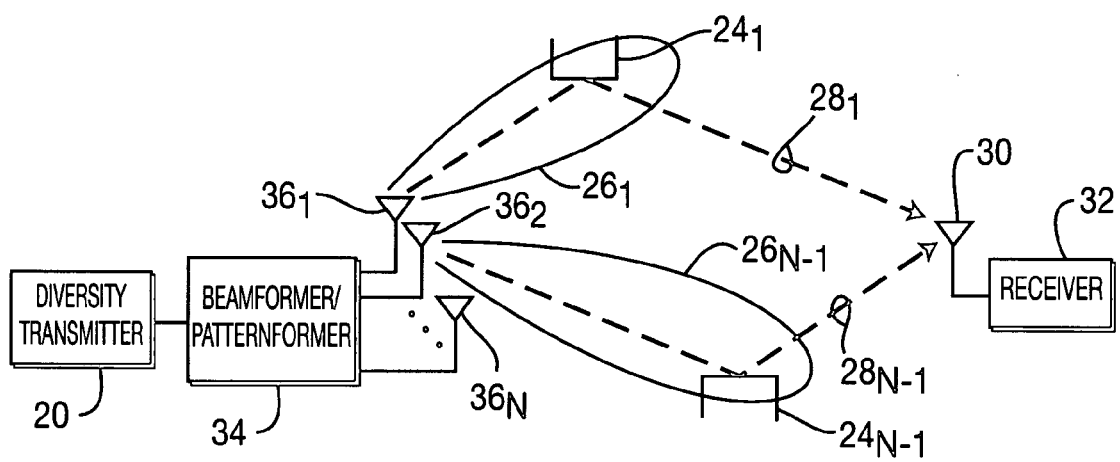
FIG. 2 is a simplified diagram of a diversity transmission system utilizing beam/pattern forming.

FIG. 2 is a simplified diagram of a diversity transmission system utilizing beam/pattern forming. The diversity transmitter 20 produces a signal or signals for transmission over an antenna array. A beamformer/pattern former 34 is used to produce distinct beams/patterns over the array. As illustrated in FIG. 2, an array having N elements $36_1$ to $36_N$ may be used to form N−1 distinct beams/patterns $26_1$ to $26_{N-1}$. These distinct beams/patterns allow for additional transmission diversity. The signals from these distinct beams/patterns $26_1$ to $26_{N-1}$ are received by an antenna or antenna array 30 of a receiver 32.

As illustrated in FIG. 2, a first beam/pattern $26_1$ directs the signal towards a scaterer $24_1$ so that one path of the signal follow path $28_1$. Also, an N−1 beam $26_{N-1}$ directs the signal towards a scaterer $24_{N-1}$ so that one path of the signal follows path $28_{N-1}$.

One technique to generate the beams are as follows. First, a maximal set of low correlation antenna elements are identified by calculating correlation values between antennas based on received signals from the receiver on either base band or radio frequency (RF). The identification may be based on channel state information (CSI) feedback from the communication entity. The high correlation set is used to enhance the low correlation set via beamforming or other technique.

To further augment spatial diversity, reflector and isolators between antenna elements may be used to separated transmission and reception spatially. These reflectors and isolators may include the use of native geography, such as buildings.

Figure 3:
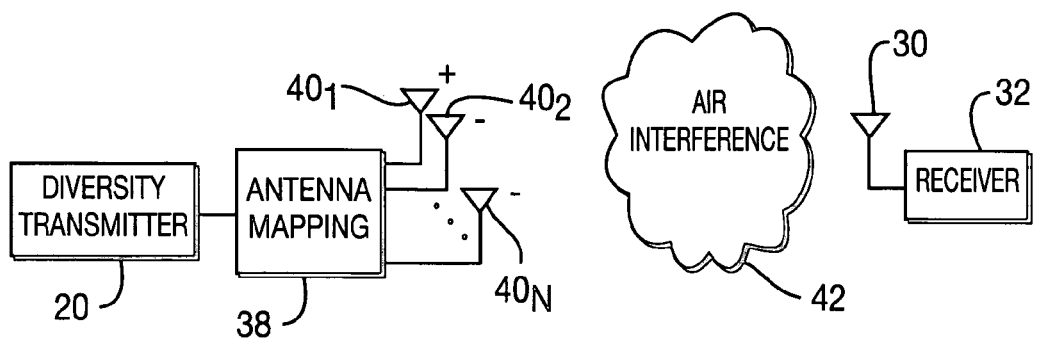
FIG. 3 is a simplified diagram of a diversity transmission system utilizing polarization.

FIG. 3 is a simplified diagram of a diversity transmission system utilizing polarization. The diversity transmitter 20 produces a signals or signals for transmission. An antenna mapper 38 maps these signals to appropriate polarized antennas $40_1$ to $40_N$ of an antenna array. Although various polarization techniques may be used, in FIG. 3, the polarization is simply illustrated by a "−" or "+" sign by each element $40_1$ to $40_N$. Although illustrated in the Figure as alternating polarization, the polarization may be done in a variety of manners. The polarization adds additional diversity to the transmissions, since the differing polarizations will typically result in different scattering patterns. Such a technique is desirable for arrays with little spatial diversity between the antenna elements, such as small footprint arrays. To illustrate, the use of an alternating polarization as illustrated in FIG. 3 allows for the effective spatial separation between elements of a same polarization to be doubled, decreasing the correlation between antenna elements. The polarized transmissions are sent through the air interface 42 to an antenna or antenna array 30 of a receiver 32.

Figure 4:
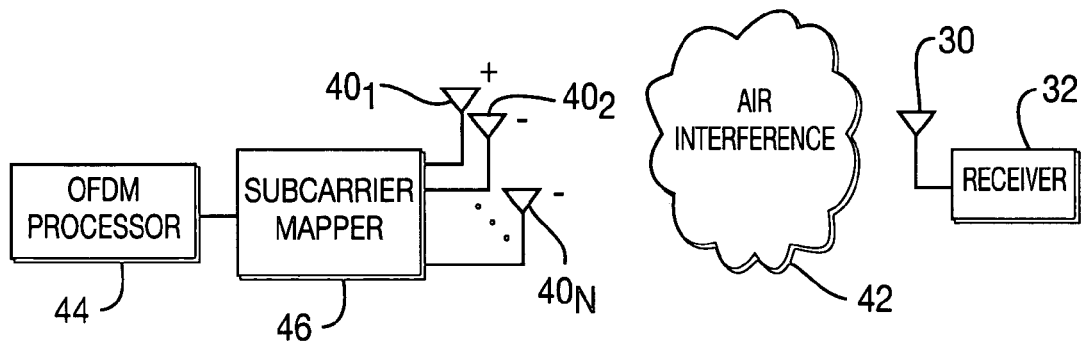
FIG. 4 is a simplified diagram of a diversity transmission system utilizing polarization in an OFDM system.

FIG. 4 is a simplified diagram of a diversity transmission system utilizing polarization in an OFDM system. An OFDM processor 44 produces subcarriers for transmission. A subcarrier mapper 46 maps corresponding subcarriers to corresponding polarized element/elements $40_1$ to $40_N$ of the antenna array. The subcarrier mapper 46 maps subcarriers that are close to each other to antennas 401 to 40N having different polarization. These polarized subcarriers are sent through the air interface 42 to an antenna or antenna array 30 of a receiver 32.

Figure 5:
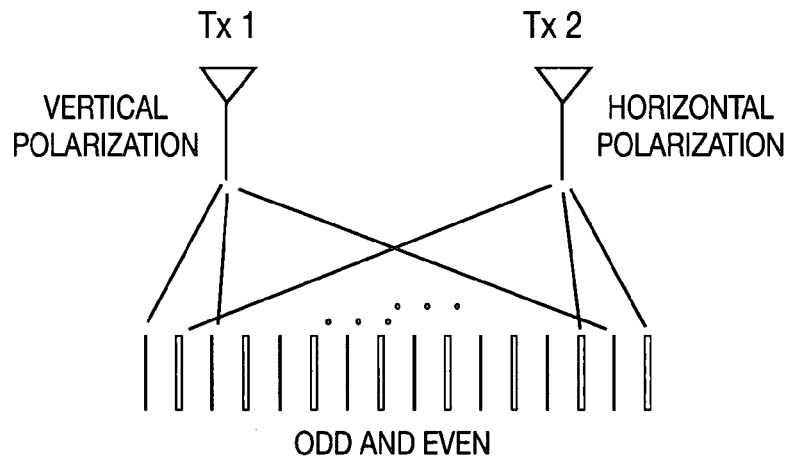
FIG. 5 is an illustration of one possible assignment of subcarriers.

FIG. 5 is an illustration of one possible assignment of subcarriers. As illustrated in FIG. 5, the subcarriers are divided into odd and even subcarriers with respect to their frequency. The odd subcarriers are illustrated with a narrow line and the even with a thick line. The odd subcarriers are sent over antenna TX1 and the even over antenna TX2. Antenna TX1 has a vertical polarization and TX2 has a horizontal polarization.

Figure 6:
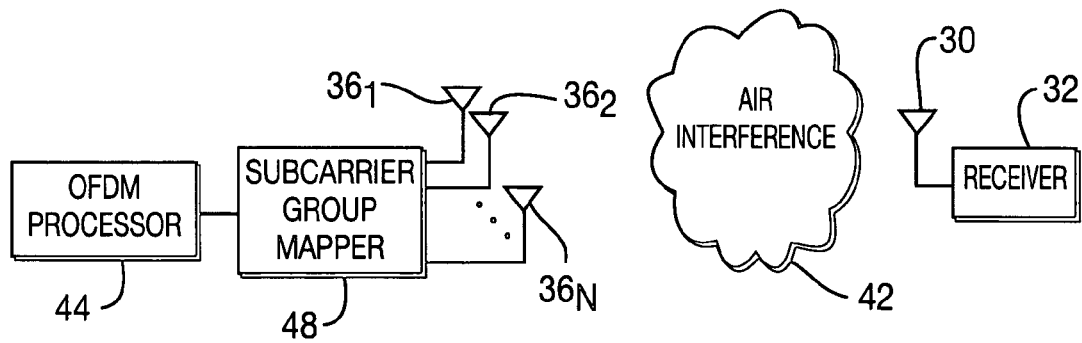
FIG. 6 is a simplified diagram of a diversity transmission system using subcarrier grouping in an OFDM system.

FIG. 6 is a simplified diagram of a diversity transmission system using subcarrier grouping in an OFDM system. Correlation between antenna elements tends to be frequency dependent. As a result, the embodiment of FIG. 6 groups subcarriers having a similar frequency and maps them to antennas based on the antenna correlation of the respective frequencies.

An OFDM processor 44 produces subcarriers for transmission. A subcarrier group mapper 48 maps subcarrier groups to a corresponding antenna/antennas $36_1$ to $36_N$. The mapping is based on antenna correlation information. Such information may be signal from the receiver or derived, such as by using channel reciprocity. The OFDM transmission is sent through the air interface 42 to an antenna or antenna array 30 and a receiver 32.

Figure 7:
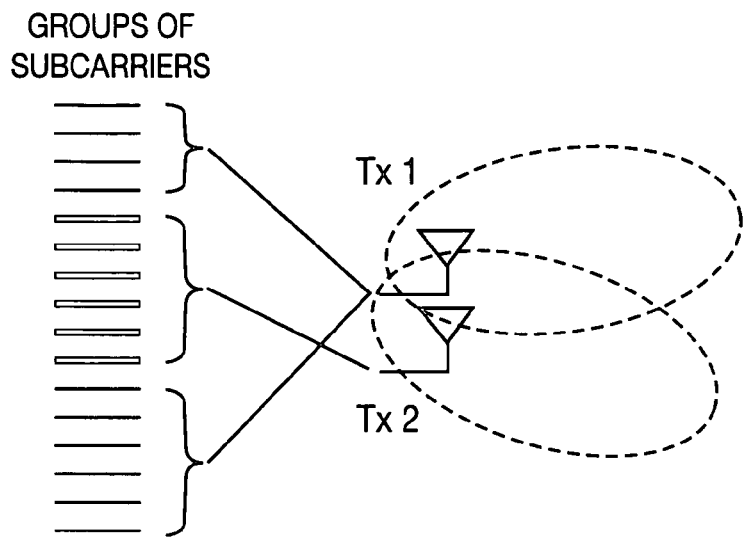
FIG. 7 is an illustration of one possible assignment of subcarrier groups.

FIG. 7 is an illustration of one possible assignment of subcarrier groups. The subcarriers are illustrated as horizontal line segments. The subcarriers are grouped as illustrated by the brackets "}". The odd groups of subcarriers as illustrated with the thinner lines are transmitted over antenna TX1 and the even group with the think line are transmitted over antenna TX2.

Figure 8:
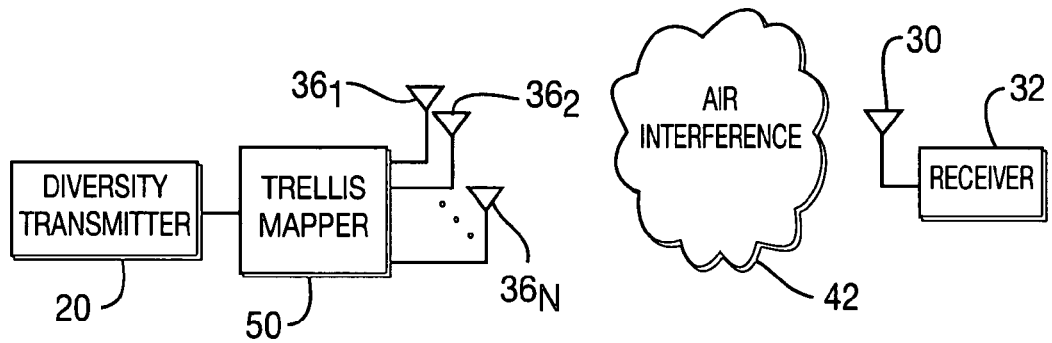
FIG. 8 is a simplified diagram of a diversity transmission system using trellis mapping.

FIG. 8 is a simplified diagram of a diversity transmission system using trellis mapping. In the embodiment of FIG. 8, Trellis coding is used to map signals to antennas to reduce the likelihood of adjacent symbols being mapped to highly correlated antennas. Trellis coded modulation is traditionally used to increase the free distance in coding. The same principle is applied to increase the "correlation distance" between adjacent symbols when mapping onto antennas. The symbols are mapped to antenna elements with respect to a Trellis code and transmitted.

A diversity transmitter 20 produces symbols of a signal/ signals for transmission. A trellis mapper 50 identifies the antennas having a high correlation and utilizes a trellis code to map adjacent symbols to uncorrelated antennas $36_1$ to $36_N$. The antenna correlation information may be signaled from the receiver or derived, such as by using channel reciprocity. The trellis mapped transmissions are sent through the air interface 42 to an antenna or antenna array 30 to a receiver 32.

Figure 9:
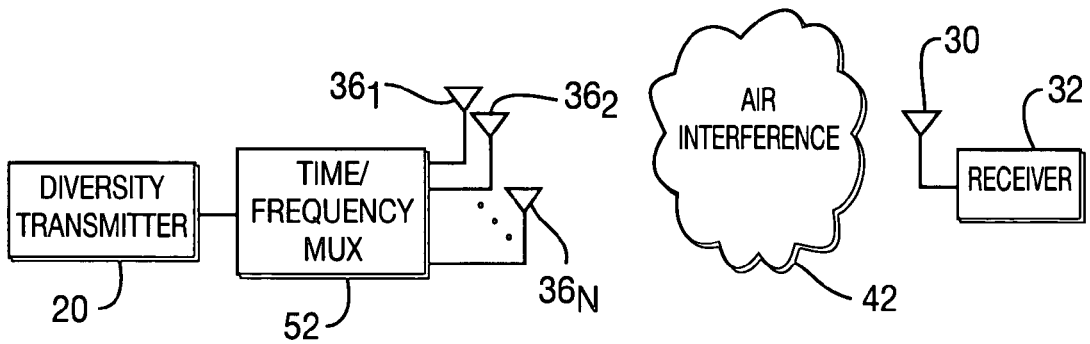
FIG. 9 is a simplified diagram of a diversity transmission system using time frequency multiplexing.

FIG. 9 is a simplified diagram of a diversity transmission system using time frequency multiplexing. A diversity transmitter 20 produces signals for transmission. These signals are time and/or frequency multiplexed by a time/frequency multiplexer (MUX) prior to transmission over the elements $36_1$ to $36_N$ of the antenna array. To illustrate, in the frequency domain, if the transmission and reception paths of two signals are separated spatially, they can be transmitted within the same frequency band or time slot. Alternately, these signals can partially overlap without degrading each other's performance significantly. The multiplexed signals/signals are sent through the air interface 42 to an antenna or antenna array 30 to a receiver 32.

Although the embodiments of FIGS. 1 through 9 are described separate from one another, they can be used in combination with one another. To illustrate, the time/frequency multiplexing of FIG. 9 can be used with the directional elements of FIG. 1. Additionally, the following embodiments are generally described as relating to an entire antenna arrays. However, the described embodiments may be utilized between a subset of the antennas/antenna elements.

What is claimed is:

1. A method for reducing antenna correlation between a plurality of transmit antennas of a transmitter, the method comprising:

generating data streams for transmission;

generating at least two beams with different polarization;

performing orthogonal frequency division multiplexing (OFDM) processing for mapping the data streams to subcarriers; and mapping the subcarriers to transmit antennas, wherein subcarriers that are close to each other are mapped to beams with different polarization.

2. The method of claim 1 wherein the beams are generated by antennas having different antenna pattern.

3. The method of claim 1 wherein the beams are directional beams generated by an array antenna.

4. The method of claim 1 wherein the beams are generated by using at least one of a reflector and an isolator.

5. The method of claim 1 wherein the beams are generated by using Metamaterial.

6. The method of claim 1 further comprising:

calculating antenna correlation between the antennas; and determining which antennas a signal is transmitted from based on at least one of the calculated antenna correlation and feedback received from a communicating entity.

7. An apparatus for reducing antenna correlation between a plurality of transmit antennas, the apparatus comprising:

a plurality of transmit antennas for generating at least two beams with different polarization;

a data processing unit configured to process data streams for transmission;

an orthogonal frequency division multiplexing (OFDM) processor for processing subcarriers; and a subcarrier mapper for mapping subcarriers to the transmit antennas, wherein subcarriers that are close to each other are mapped to beams with different polarization.

* * * * *

UNITED STATES PATENT AND TRADEMARK OFFICE
CERTIFICATE OF CORRECTION

PATENT NO.       : 7,599,668 B2
APPLICATION NO.  : 11/202570
DATED            : October 6, 2009
INVENTOR(S)      : Ozluturk et al.

It is certified that error appears in the above-identified patent and that said Letters Patent is hereby corrected as shown below:

Title Page

IN THE ABSTRACT

At Item (57), ABSTRACT, page 1, right column, line 5, after the words "point away" insert --from--.

At Item (57), ABSTRACT, page 1, right column, line 8, after the word "antenna" delete "pattern" and insert therefor --patterns--.

IN THE SPECIFICATION

At column 1, line 52, after the words "point away" insert --from--.

At column 1, line 55, after the word "antenna" delete "pattern" and insert therefor --patterns--.

At column 3, line 21, after the words "towards a" delete "scaterer" and insert therefor --scatterer--.

At column 3, line 23, after the words "towards a" delete "scaterer" and insert therefor --scatterer--.

At column 3, line 40, after the words "produces a" delete "signals" and insert therefor --signal--.

At column 4, line 29, after the words "with the" delete "think" and insert therefor --thick--.

At column 4, line 59, after the word "multiplexed" delete "signals/signals" and insert therefor --signal/signals--.

At column 5, line 1, after the word "antenna" delete "arrays" and insert therefor --array--.

IN THE CLAIMS

At claim 2, column 5, line 17, after the word "antenna" delete "pattern." and insert therefor --patterns.--.

At claim 6, column 6, line 7, after the word "feedback" insert --data--.

Signed and Sealed this

Sixteenth Day of February, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,599,668 B2 | Page 1 of 1 |
| APPLICATION NO. | : 11/202570 | |
| DATED | : October 6, 2009 | |
| INVENTOR(S) | : Ozluturk et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1029 days.

Signed and Sealed this

Twenty-eighth Day of September, 2010

David J. Kappos
*Director of the United States Patent and Trademark Office*